United States Patent [19]

Schnur

[11] Patent Number: 5,976,399
[45] Date of Patent: Nov. 2, 1999

[54] BLENDED POLYOL ESTER LUBRICANTS FOR REFRIGERANT HEAT TRANSFER FLUIDS

[75] Inventor: Nicholas E. Schnur, Cincinnati, Ohio

[73] Assignee: Henkel Corporation, Gulph Mills, Pa.

[21] Appl. No.: 08/482,453

[22] Filed: Jun. 7, 1995

Related U.S. Application Data

[63] Continuation-in-part of application No. 08/347,408, Dec. 2, 1994, abandoned, and a continuation of application No. PCT/US92/04438, Jun. 3, 1992.

[51] Int. Cl.⁶ ................. C09K 5/04; C10M 105/34; C10M 105/38
[52] U.S. Cl. .................. 252/68; 62/84; 62/468; 252/67; 508/485
[58] Field of Search ............. 252/68, 67, 56 S, 252/56 R; 508/485; 62/84, 468

[56] References Cited

U.S. PATENT DOCUMENTS

| Re. 19,265 | 8/1934 | Midgley et al. .................. 62/114 |
| 2,040,902 | 5/1936 | Zellhoefer .................. 252/69 |
| 2,084,950 | 6/1937 | Downing et al. ................ 62/114 |
| 2,187,388 | 1/1940 | Williams et al. .................. 252/68 |
| 2,520,612 | 8/1950 | Roberts et al. .................. 568/613 |
| 2,548,493 | 4/1951 | Robey .................. 560/190 |
| 2,575,195 | 11/1951 | Smith .................. 560/154 |
| 2,575,196 | 11/1951 | Smith .................. 560/154 |
| 2,628,974 | 2/1953 | Sanderson .................. 560/199 |
| 2,717,242 | 9/1955 | Foehr .................. 508/202 |
| 2,807,155 | 9/1957 | Williamitis .................. 62/502 |
| 2,852,470 | 9/1958 | Henne et al. .................. 252/68 |
| 2,926,139 | 2/1960 | Mott et al. .................. 252/68 |
| 2,958,706 | 11/1960 | Hurwitz et al. .................. 560/248 |
| 2,961,406 | 11/1960 | McNeil .................. 508/308 |
| 2,962,419 | 11/1960 | Minich .................. 424/122 |
| 3,135,785 | 6/1964 | Fritz .................. 560/199 |
| 3,189,629 | 6/1965 | Huttenlocher et al. .................. 554/106 |
| 3,194,791 | 7/1965 | Wilson et al. .................. 528/283 |
| 3,202,701 | 8/1965 | Young et al. .................. 560/199 |
| 3,282,971 | 11/1966 | Metro et al. .................. 554/227 |
| 3,309,318 | 3/1967 | Aylesworth et al. .................. 252/56 S |
| 3,328,283 | 6/1967 | Godar .................. 208/48 A |

(List continued on next page.)

FOREIGN PATENT DOCUMENTS

| 252876 | 12/1960 | Australia . |
| 2022832 | 7/1991 | Canada . |
| 0359071 | of 0000 | European Pat. Off. . |
| 00 89709 A1 | 9/1983 | European Pat. Off. . |
| 195110 | 9/1986 | European Pat. Off. . |
| 218207 | 4/1987 | European Pat. Off. . |
| 02 27477 A2 | 7/1987 | European Pat. Off. . |
| 272575 | 6/1988 | European Pat. Off. . |
| 315069 | 5/1989 | European Pat. Off. . |
| 336171 | 10/1989 | European Pat. Off. . |
| 03 59071 A1 | 3/1990 | European Pat. Off. . |
| 0377122 A1 | 7/1990 | European Pat. Off. . |
| 378176 | 7/1990 | European Pat. Off. . |
| 379175 | 7/1990 | European Pat. Off. . |
| 0384724 A1 | 8/1990 | European Pat. Off. . |
| 406479 | 1/1991 | European Pat. Off. . |
| 415778 | 3/1991 | European Pat. Off. . |
| 430657 | 6/1991 | European Pat. Off. . |
| 435253 | 7/1991 | European Pat. Off. . |
| 440069 | 7/1991 | European Pat. Off. . |
| 04 40069 A1 | 8/1991 | European Pat. Off. . |
| 445610 | 9/1991 | European Pat. Off. . |
| 448402 | 9/1991 | European Pat. Off. . |
| 04 49406 A1 | 10/1991 | European Pat. Off. . |

(List continued on next page.)

OTHER PUBLICATIONS

Predicting Behavior of Oils in Refrigeration Systems:, Bosworth, C.M., Refrigerating Engineering, Jun. 1952.

Synthetic Lubricants and Their Refrigeration applications, Short, Glenn D. Presented at the 44th Annual Meeting of the Society of Tribologists and Lubrication Engineers, Atlanta, Georgia, May 1–4, 1989, pp. 1–9.

Diester Compressor Oils in Refrigeration, Fluid & Lubrication Ideas, Fall, 1979 pp. 25, 26.

CA 110:215912z Synthetic Oil For Use With R–22 and R–502 Cooling Agents Texhnol. Topl. Mosel (1989). No Month available.

CA 104:227382r Synthetic Lubricants for Regrigeration Systems, Seto, Kazuki (Matsumora Oil Co. Ltd., Japan) REITO 1985 69(694) 802–9. No motn available.

Evaluation of Lubricants for Refrigeration and Air–Condition Compressors, Spauschus, Hans O. Cite Ashrae Transactions 90 (Pt. 28): 784–798 (1984). No month available.

Neopentyl Polyol Ester Lubricants–Bulk Property Optimization; Niedzielski, Edmund; Ind. Eng. Chem., Prod. Res. Dev., vol. 15, No. 1, 1976. No month available.

Lubricants and Related Products, pp. 122–125; Klamann, Dieter; 1984. No month available.

Synthetic Ester Lubricants; Barnes, R.S. et al., Lubrication Engineering; Aug. 1957.

New Type Lube Oil for HFC–134a Compressor System; Takeno, T. et al.; 1992. No month available.

A. Altman et al., "Synthetic Lubricant", Translation of Russian Patent No. 208868 (Application No. 1028071/23–4), Feb. 1968.

Chemical Abstract, vol. 96 71653H (Japanese 80–145638), Nov. 1980.

K. Sandvordenker, "Materials Compatibility of R134a in Refrigerant Systems", CFCS: Time of Transition, American Society of Heating, Refrigerating and Air–Conditioning Engineers, Inc., pp. 211–216, Jan. 1989.

(List continued on next page.)

*Primary Examiner*—Christine Skane
*Attorney, Agent, or Firm*—Ernest G. Szoke; Wayne C. Jaeschke; John S. Child, Jr.

[57] ABSTRACT

An ester blend, including an ester having neopentylglycol and a source of 2-ethylhexanoic acid as its reactive components and an ester having pentaerythritol and a source of 2-ethylhexanoic acid as its reactive components, is especially effective as a lubricant for chlorine-free fluorocarbon refrigerant heat transfer fluids, particularly Refrigerant 134a (1,1,1,2-tetrafluoroethane).

4 Claims, No Drawings

U.S. PATENT DOCUMENTS

| | | | |
|---|---|---|---|
| 3,328,285 | 6/1967 | Godar | 208/48 AA |
| 3,341,574 | 9/1967 | Taylor et al. | 560/199 |
| 3,441,600 | 4/1969 | Chao et al. | 560/263 |
| 3,523,084 | 8/1970 | Chao et al. | 554/485 |
| 3,560,387 | 2/1971 | Schritt | 508/485 |
| 3,562,300 | 2/1971 | Chao et al. | 254/165 |
| 3,564,044 | 2/1971 | Chao et al. | 560/263 |
| 3,694,382 | 9/1972 | Kleiman et al. | 508/485 |
| 3,773,668 | 11/1973 | Denis et al. | 508/494 |
| 3,778,454 | 12/1973 | Kleiman et al. | 554/227 |
| 3,850,824 | 11/1974 | Nebzydoski et al. | 508/279 |
| 3,878,112 | 4/1975 | Luck et al. | 252/68 |
| 3,894,959 | 7/1975 | Gardiner et al. | 174/137 B |
| 3,939,201 | 2/1976 | Bacskai | 560/263 |
| 4,045,376 | 8/1977 | Rubin et al. | 508/474 |
| 4,049,563 | 9/1977 | Burrous | 508/209 |
| 4,053,491 | 10/1977 | Koch et al. | 654/227 |
| 4,113,642 | 9/1978 | Koch et al. | 508/492 |
| 4,144,183 | 3/1979 | Koch et al. | 508/485 |
| 4,155,861 | 5/1979 | Schmitt et al. | 508/492 |
| 4,159,255 | 6/1979 | Gainer et al. | 252/68 |
| 4,175,045 | 11/1979 | Timony | 508/485 |
| 4,178,261 | 12/1979 | Dhein et al. | 508/485 |
| 4,199,461 | 4/1980 | Olund | 252/68 |
| 4,212,816 | 7/1980 | Hentschel et al. | 554/227 |
| 4,234,497 | 11/1980 | Honig | 554/172 |
| 4,243,540 | 1/1981 | Mancini et al. | 508/485 |
| 4,248,726 | 2/1981 | Uchinuma et al. | 508/304 |
| 4,263,159 | 4/1981 | Berens et al. | 252/79 |
| 4,267,064 | 5/1981 | Sasaki et al. | 508/304 |
| 4,292,187 | 9/1981 | Hentschel et al. | 508/455 |
| 4,302,343 | 11/1981 | Carswell et al. | 508/280 |
| 4,304,678 | 12/1981 | Schick et al. | 508/308 |
| 4,320,018 | 3/1982 | Yaffee | 508/439 |
| 4,324,676 | 4/1982 | Gilbert | 252/79 |
| 4,359,394 | 11/1982 | Gainer et al. | 252/68 |
| 4,371,577 | 2/1983 | Sato et al. | 428/96 |
| 4,428,854 | 1/1984 | Enjo et al. | 252/69 |
| 4,431,557 | 2/1984 | Shimazu et al. | 252/68 |
| 4,440,660 | 4/1984 | van Rijs et al. | 508/485 |
| 4,454,052 | 6/1984 | Shoji et al. | 252/68 |
| 4,455,247 | 6/1984 | Nakayama et al. | 252/67 |
| 4,487,874 | 12/1984 | Linder | 524/311 |
| 4,530,772 | 7/1985 | Timony | 508/282 |
| 4,557,850 | 12/1985 | Ando et al. | 252/68 |
| 4,559,154 | 12/1985 | Powell | 252/69 |
| 4,719,025 | 1/1988 | Akiyama et al. | 508/499 |
| 4,751,012 | 6/1988 | Ward et al. | 508/282 |
| 4,755,316 | 7/1988 | Magid et al. | 252/68 |
| 4,758,366 | 7/1988 | Parekh | 252/68 |
| 4,780,229 | 10/1988 | Mullin | 508/282 |
| 4,812,262 | 3/1989 | Shinzawa et al. | 252/579 |
| 4,826,633 | 5/1989 | Carr et al. | 508/485 |
| 4,851,144 | 7/1989 | McGraw et al. | 252/68 |
| 4,900,463 | 2/1990 | Thomas et al. | 252/68 |
| 4,927,554 | 5/1990 | Jolley et al. | 252/68 |
| 4,938,887 | 7/1990 | Grava et al. | 252/68 |
| 4,941,986 | 7/1990 | Jolley | 252/68 |
| 4,944,890 | 7/1990 | Deeb et al. | 252/68 |
| 4,948,525 | 8/1990 | Sasaki et al. | 508/304 |
| 4,959,169 | 9/1990 | McGraw et al. | 252/68 |
| 4,963,282 | 10/1990 | Jolley et al. | 252/67 |
| 4,992,188 | 2/1991 | Jolley | 252/68 |
| 5,008,028 | 4/1991 | Jolley et al. | 252/68 |
| 5,021,179 | 6/1991 | Zehler et al. | 252/68 |
| 5,021,180 | 6/1991 | McGraw | 252/68 |
| 5,023,007 | 6/1991 | Grava et al. | 252/67 |
| 5,032,305 | 7/1991 | Kamekura et al. | 252/68 |
| 5,032,306 | 7/1991 | Cripps | 252/68 |
| 5,053,155 | 10/1991 | Mahler | 252/68 |
| 5,057,247 | 10/1991 | Schmid et al. | 508/481 |
| 5,061,550 | 10/1991 | Shimizu et al. | 428/209 |
| 5,080,816 | 1/1992 | Sakamoto et al. | 508/582 |
| 5,096,606 | 3/1992 | Hagihara et al. | 252/68 |
| 5,137,650 | 8/1992 | Kaneko | 252/68 |
| 5,158,698 | 10/1992 | Jolley et al. | 252/686 |
| 5,185,092 | 2/1993 | Fukuda et al. | 252/68 |
| 5,202,044 | 4/1993 | Hagihara et al. | 252/68 |
| 5,211,884 | 5/1993 | Bunemann et al. | 508/485 |
| 5,262,076 | 11/1993 | Ishida et al. | 508/433 |
| 5,273,410 | 12/1993 | Kitaichi et al. | 418/100 |
| 5,290,465 | 3/1994 | Sabahi | 252/68 |
| 5,310,492 | 5/1994 | Seiki et al. | 252/68 |
| 5,354,486 | 10/1994 | Evan | 508/501 |
| 5,391,313 | 2/1995 | Antika et al. | 252/68 |
| 5,494,597 | 2/1996 | Krevalis, Jr. et al. | 252/68 |
| 5,711,165 | 1/1998 | Iizuka et al. | 62/474 |

FOREIGN PATENT DOCUMENTS

| | | |
|---|---|---|
| 04 52509 A1 | 10/1991 | European Pat. Off. . |
| 0458584 A1 | 11/1991 | European Pat. Off. . |
| 458584 | 11/1991 | European Pat. Off. . |
| 04 61262 B1 | 12/1991 | European Pat. Off. . |
| 522167 | 12/1991 | European Pat. Off. . |
| 468729 | 1/1992 | European Pat. Off. . |
| 0480479 | 4/1992 | European Pat. Off. . |
| 479338 | 4/1992 | European Pat. Off. . |
| 480479 | 4/1992 | European Pat. Off. . |
| 498152 | 8/1992 | European Pat. Off. . |
| 499994 | 8/1992 | European Pat. Off. . |
| 05 36814 A1 | 4/1993 | European Pat. Off. . |
| 445611 | 4/1994 | European Pat. Off. . |
| 2154524 | 5/1973 | France . |
| 2302290 | 10/1976 | France . |
| 133966 | 1/1979 | Germany . |
| 2943446 | 5/1980 | Germany . |
| 2943446 A1 | 5/1980 | Germany . |
| 1768765 | 10/1980 | Germany . |
| 4105956 | 8/1992 | Germany . |
| 53-136170 | 11/1978 | Japan . |
| 53-143609 | 12/1978 | Japan . |
| 54-040260 | 3/1979 | Japan . |
| 54-130758 | 10/1979 | Japan . |
| 1259093 | 10/1980 | Japan . |
| 55-145638 | 11/1980 | Japan . |
| 55-155093 | 12/1980 | Japan . |
| 55-157537 | 12/1980 | Japan . |
| 56-036570 | 4/1981 | Japan . |
| 56-36570 | 4/1981 | Japan . |
| 56-125494 | 10/1981 | Japan . |
| 56-125495 | 10/1981 | Japan . |
| 56-125496 | 10/1981 | Japan . |
| 56-131548 | 10/1981 | Japan . |
| 56-133241 | 10/1981 | Japan . |
| 57-078475 | 5/1982 | Japan . |
| 58-015592 | 1/1983 | Japan . |
| 58-15592 | 1/1983 | Japan . |
| 58-103594 | 6/1983 | Japan . |
| 59-021632 | 2/1984 | Japan . |
| 59-027979 | 2/1984 | Japan . |
| 59-029625 | 2/1984 | Japan . |
| 59-21632 | 2/1984 | Japan . |
| 59-164393 | 9/1984 | Japan . |
| 60-085478 | 5/1985 | Japan . |
| 60-133022 | 7/1985 | Japan . |
| 61-062596 | 3/1986 | Japan . |
| 61-62596 | 3/1986 | Japan . |
| 61-171799 | 8/1986 | Japan . |
| 61-181895 | 8/1986 | Japan . |
| 62-000592 | 1/1987 | Japan . |
| 62-290795 | 12/1987 | Japan . |
| 62-292895 | 12/1987 | Japan . |

| | | |
|---|---|---|
| 1259095 | 10/1989 | Japan . |
| 3-088892 | 4/1991 | Japan . |
| 485396 | 3/1992 | Japan . |
| 96079 | 12/1980 | Romania . |
| 208868 | 7/1968 | U.S.S.R. . |
| 1057526 | 11/1983 | U.S.S.R. . |
| 644597 | 10/1950 | United Kingdom . |
| 662650 | 12/1951 | United Kingdom . |
| 760490 | 10/1956 | United Kingdom . |
| 889067 | 2/1962 | United Kingdom . |
| 892943 | 4/1962 | United Kingdom . |
| 894639 | 4/1962 | United Kingdom . |
| 1028402 | 5/1966 | United Kingdom . |
| 1460665 | 2/1974 | United Kingdom . |
| 2216541 | 10/1989 | United Kingdom . |
| WO8808023 | 10/1988 | WIPO . |
| 9005831 | 11/1988 | WIPO . |
| WO9012849 | 11/1990 | WIPO . |
| WO 9105831 | 5/1991 | WIPO . |
| WO9201030 | 1/1992 | WIPO . |
| WO9301249 | 1/1993 | WIPO . |
| WO9311210 | 6/1993 | WIPO . |

OTHER PUBLICATIONS

Synthetic Lubricants (Ch. 10, Neopentyl Polyol Esters); Smith, Thomas; 1962; No month available Midland Michigan.

Complex Esters of 2,2–Dimethylhydracrylic Acid; Lederie, Henry F.; New Haven, CT; HEC Product Research and Development vol. 8, No. 1 Mar. 1969.

Grant & Hackh's Chemical Dictionary 5th Edition; 1987, No month available pp. 11 and 284.

Hewleys's Condensed Chemical Dictionary 11th Edition; 1987 p. 214.

Das FCKW–Problem Fur die Kaltetechnik; Hesse, Ulrich et al.; 4/1988 (German).

H.H. Kruse and M. Schroeder, "Fundamentals of Lubrication in Refrigerating Systems and Heat Pumps", Ashrae Transactions, vol. 90, Part 28, KC–84–14, p. 763, Kansas City Missouri, 1984.

ns. 5,976,399

BLENDED POLYOL ESTER LUBRICANTS FOR REFRIGERANT HEAT TRANSFER FLUIDS

CROSS-REFERENCE TO RELATED APPLICATION

This application is a continuation-in-part of U.S. application Ser. No. 08/347,408 filed Dec. 2, 1994 now abandoned and a continuation of International Application No. PCT/US92/04438 designating the United States, filed Jun. 3, 1992.

BACKGROUND OF THE INVENTION

1. Field of the Invention

This invention relates to polyol ester lubricant base stocks, which can also serve as complete lubricants in some cases, refrigerant working fluids including lubricants according to the invention along with primary heat transfer fluids, as well as methods for using these materials in refrigeration equipment. The lubricants and lubricant base stocks are generally suitable for use with most or all halocarbon refrigerants and are particularly suitable for use with substantially chlorine-free, fluoro-group containing heat transfer fluids such as pentafluoroethane, 1,1-difluoroethane, 1,1,1-trifluoroethane, and 1,1,1,2-tetrafluoroethane.

2. State of Related Art

Chlorine-free heat transfer fluids are desirable for use in refrigeration and air conditioning systems, because their escape into the atmosphere causes less damage to the environment than the currently most commonly used chlorofluorocarbon heat transfer fluids, such as trichlorofluoromethane and dichlorodifluoromethane. The widespread commercial use of chlorine-free refrigerant heat transfer fluids has been hindered, however, by the lack of commercially adequate lubricants. This is particularly true for one of the most desirable heat transfer fluids, 1,1,1,2-tetrafluoroethane, commonly known in the art as "Refrigerant 134a" or simply "R134a". Other fluoro-substituted ethanes are also effective heat transfer fluids.

The following patents and published patent applications disclose a number of general classes and specific examples of polyol esters as useful refrigerant lubricants with chlorine-free fluoro group-containing heat transfer fluids: U.S. Pat. No. 4,851,144; UK 2 216 541; U.S. Pat. No. 5,021,179; U.S. Pat. No. 5,096,606; WO 90/12849 (Lubrizol); EP 0 406 479 (Kyodo Oil); EP 0 430 657 (Ashai Denka KK); EP 0 435 253 (Nippon Oil); EP 0 445 610 and 0 445 611 (Hoechst AG); EP 0 449 406 (Tonen Corp.); EP 0 458 584 (Unichema Chemie BV); and EP 0 485 979 (Hitachi).

Refrigeration lubricants must have a wide variety of viscosities and other physical and chemical properties to achieve optimal effectiveness in the many different types of refrigeration equipment currently in use.

For example, conventional home refrigerators generally are designed to maintain cool temperatures within a relatively small and well insulated space. Accordingly, low power compressors are generally employed for such refrigerators, and lubricants with relatively low viscosities at normal operating temperatures are generally satisfactory for such use. Low viscosity lubricants are preferred for economy of operation, because with all other factors being equal, a refrigerant working fluid comprising a low viscosity lubricant reduces power consumption because of the greater ease of circulation of the lower viscosity refrigerant working fluids. With the rising cost of electric power, consumers are requiring greater efficiency in their home appliances.

By contrast, automobile air conditioners and industrial refrigeration systems require relatively higher viscosity lubricants by reason of the more extreme conditions under which such systems operate.

Even in low power compressors, a certain minimum viscosity is required to avoid excessive depletion of the lubricant from those surfaces of refrigeration machinery that need lubrication during operation, but are not immersed in the refrigerant working fluid, e.g., during periods in which the compressor and other moving parts of the refrigeration system are idle.

Mutual miscibility between the refrigerant and lubricant of the refrigerant working fluid is also very important, as the lubricant should not separate from the refrigerant at high or low temperatures. If the miscibility between the lubricant and refrigerant is low, moving parts of the refrigeration system may seize as a result of inadequate lubrication.

In addition, the lubricant for a refrigeration system must have high hydrolytic stability, must not be corrosive to the refrigerating machinery, and must not chemically react with the refrigerant over a wide temperature range. The hydrolytic stability of a refrigeration lubricant is extremely important. Ester lubricants that are not hydrolytically stable tend to react with moisture present in the compressor to form acidic substances that can lead to corrosion and otherwise interfere with the proper operation of the compressor. A related concern is the relative amount of unreacted acid in the lubricant. In this regard, lubricants containing an acid value of no more than 0.2 AV may cause corrosion problems or otherwise interfere with the effectiveness of the compressor. Accordingly, the ester lubricant base stocks should have an acid value of no greater than 0.2 AV as measured by the test for hydrolytic stability and preferably no greater than 0.1 AV, with increasing preference no greater than 0.08, 0.06 and 0.05, 0.04, 0.03, 0.02, and 0.01 AV.

Under the laws of many countries, any new chemical has to be tested for safety before it can legally be sold for general use, and any product obtained by reacting new mixtures of ingredients is usually defined as a new chemical. Therefore, every distinct mixture of polyol esters is likely to be subject to regulatory approval at very substantial expense for each such distinct mixture, in order to be legally sold in any country where such laws are in effect. One such regulatory system is the European EINCES registry. Thus, in formulating a lubricant for refrigeration applications, it is advisable to use known chemical entities whose properties are well characterized, and especially those that have been previously approved by governmental regulatory agencies, as such chemicals in different formulations are often exempted from legal requirements for regulatory approval, or at least subjected to less extensive, and therefore less expensive, testing than is required for mixtures legally categorized as new chemical entities. There is, therefore, a technical and economic incentive to provide lubricant base stocks suitable for most or all of the wide variety of conditions of lubricant service by blending from the smallest possible number of chemical components.

Accordingly, it is an object of the present invention to provide a lubricating oil for a chlorine-free refrigerant, and in particular 1,1,1,2-tetrafluoroethane refrigerant, that is miscible, but unreactive, with the refrigerant over a wide temperature range. Another object of the invention is to provide a lubricant having a controlled range of viscosity values, as well as satisfactory hydrolytic stability and very low concentration of unreacted acid. A further object of the present invention is to prepare a lubricant from registered chemicals or blends of chemicals that are approved for commercial use, or require little effort and expense to obtain pre-marketing approval.

SUMMARY OF THE INVENTION

It has now been found that high quality ester lubricants can be obtained which have the required viscosity grades and which are highly stable with chlorine-free fluorocarbon refrigerants over a wide temperature range. These esters also have excellent hydrolytic stability and low concentrations of free acid. The esters are obtained by blending selected esters, as described below, which are made from EINCES registered chemicals.

The lubricant composition of the present invention consists essentially of an ester blend including ester (A) having neopentylglycol and a source of 2-ethylhexanoic acid as its reactive components, in an amount of about 30–90% based on the total weight of said composition and ester (B), having pentaerythritol and a source of 2-ethylhexanoic acid as its reactive components, in an amount from about 10–70 weight percent, based on the total weight of the composition.

The lubricant composition preferably contains 50–85 weight percent of ester (A) and 15–50 weight percent of ester (B). A composition containing 70–85 weight percent of ester (A) and 15–30 weight percent of ester (B) is particularly preferred.

The above-described ester blend may be used as such, or, depending on the end use, may have one or more additives incorporated therein to provide a compounded lubricant.

The ester blend of the invention is used to particular advantage as a component of a refrigerant working fluid, together with various chlorine-free, fluoro-group containing heat transfer fluids, especially 1,1,1,2-tetrafluoroethane (R-134a).

The refrigerant working fluids of the invention produce good results in practice in operating a refrigerator comprising cyclic compression, liquefaction, expansion and evaporation of a heat transfer fluid.

DETAILED DESCRIPTION OF THE INVENTION

Except in the claims and the operating examples, or where otherwise expressly indicated, all numerical quantities in this description indicating amounts of material or conditions of reaction and/or use are to be understood as modified by the term "about" in defining the broadest scope of the invention. Practice of the invention within the boundaries corresponding to the exact quantities stated is usually preferable, however.

For each of the esters which are blended in the lubricant composition of the invention, it is possible to obtain the same esters by reacting acid derivatives such as acid anhydrides, acyl chlorides, and esters of the acids instead of reacting the acids themselves. The acids are generally preferred for economy and are exemplified herein, but it is to be understood that the esters defined herein by reaction with acids can be equally well obtained by reaction of alcohols with the corresponding acid derivatives. The term "source of 2-ethylhexanoic acid" as used herein thus refers to the acid per se, as well as to the corresponding acid anhydride, acyl halide, and ester derivatives.

It has been experimentally shown that the ester of neopentylglycol (henceforth "NPG"_ with 2-ethylhexanoic acid ("EHA") is very useful as a blending stock, because it is miscible in all proportions with most or all fluorocarbon refrigerants over a temperature range of at least −55° C. up to 80° C. This ester is also capable of solubilizing other higher viscosity and less soluble hindered polyol esters. Another advantageous property of this ester is that it effectively reduces the viscosity of other types of blending stock with which it may be mixed, and is substantially less likely than esters of acids with fewer than five carbon atoms per molecule to promote corrosion. However, the viscosity of such an ester is lower than is normally desirable for existing refrigeration machinery.

The desired range of viscosity, i.e. between about 10 and about 40 centistokes at 40° C., is attained by binding the above described NPG-EHA ester which has less than an optional viscosity with an ester formed from pentaerythritol ("PE") and EHA, which has a more acceptable viscosity. The last referenced ester, however, is not as miscible as the NPG-EHA ester.

Concerning the reactive components of the esters which form the lubricant composition of the invention, it is to be understood that although only the desired alcohols and acids are explicitly specified, some amount of the sort of impurities normally present in technical or industrial grade products may be tolerable in most cases. For example, "tech pentaerythritol" (PE) normally contains on the order of 85–90 weight % of mono PE, along with 10–15 weight % of di-pentaerythritol ("DPE") and 0–3% of tri-pentaerythritol ("TPE"), and is quite satisfactory for making high quality esters in many cases. Also, "commercial neopentylglycol" (NPG) normally contains up to 3 weight % impurities. Similarly, "commercial 2-ethylhexanoic acid" (EHA) normally contains on the order of up to 2 weight % impurities.

In practice, it has been found that reaction between the alcohol(s) and the acid(s) reactants of the respective esters proceeds more effectively if the quantity of acid charged to the reaction mixture initially is enough to provide an excess of 10–25% of equivalents of acid over the equivalents of alcohol reacted with the acid. (An equivalent of acid is defined for the purposes of this description as the amount containing one gram equivalent weight of carboxyl groups, wherein an equivalent of alcohol is the amount containing one gram equivalent weight of hydroxyl groups.) The composition of the mixture of acids and alcohols that have actually reacted can be determined by analysis of the produce ester mixture for its acyl group content.

In making the ester blend component, according to this invention, the acid reacted will be lower boiling than the alcohol(s) reacted and the product ester(s). When this condition obtains, it is preferred to remove the bulk of any excess acid remaining at the end of the esterification reaction by distillation, most preferably at a low pressure such as 1–5 torr.

After such vacuum distillation, the product is often ready for use as a lubricant blending stock according to this invention. If further refinement of the products is desired, the content of free acid in the product after the first vacuum distillation may be further reduced by treatment with epoxy esters, as taught in U.S. Pat. No. 3,485,754 or by neutralization with any suitable alkaline material such as lime, alkali metal hydroxides, or alkali metal carbonates.

If treatment with epoxy esters is used, excess epoxy esters may be removed by a second distillation under very low pressure, while the product of reaction between the epoxy ester and residual acid may be left behind in the product without harm. If alkali neutralization is used as the refinement method, subsequent washing with water, to remove any unreacted excess fatty acid neutralized by the alkali, is strongly preferred before using the product in forming a lubricant ester blend.

Ester base stocks according to this invention consist essentially of about 30–90 weight percent of the NPG-EHA ester (A) and 10–70 weight percent of the PE-EHA ester (B). Additionally and independently, it is preferable for the blending stocks according to this invention to be selected so that a blend of any ISO grade between 10 and 32, inclusive, may be prepared from the two blending stocks.

Under some conditions of use, the ester blend described herein will function satisfactorily as a complete lubricant. It is generally preferable, however, for a complete lubricant to contain other materials generally known in the art as additives, such as oxidation resistance and thermal stability improvers, corrosion inhibitors, metal deactivators, lubricity additives, viscosity index improvers, pour and/or floc point depressants, detergents, dispersants, foam promoting agents, antifoaming agents, anti-wear agents, and extreme pressure resistant additives. Many additives may impart both anti-wear and extreme pressure resistance properties, or function both as a metal deactivator and a corrosion inhibitor. Cumulatively, all additives preferably do not exceed 8% by weight, or more preferably do not exceed 5% by weight, of the total compounded lubricant formulation.

An effective amount of the foregoing additive types is generally in the range of 0.01 to 5% for the antioxidant compound, 0.01 to 5% for the corrosion inhibitor component, from 0.001 to 0.5% for the metal deactivator component, from 0.5 to 5% for the lubricity additives, from 0.01 to 2% for each of the viscosity index improvers and pour and/or floc point depressants, from 0.1 to 5% for each of the detergents and dispersants, from 0.001 to 0.1% for foam promoting agents or anti-foam agents, and from 0.1–2% for each of the anti-wear and extreme pressure resistance components. All these percentages are by weight and are based on the total lubricant composition. It is to be understood that more or less than the stated amounts of additives may be more suitable to particular circumstances, and that a single molecular type or a mixture of types may be used for each type of additive component. Also, the examples listed below are intended to be merely illustrative and not limiting, except as circumscribed by the appended claims.

Examples of suitable oxidation resistance and thermal stability improvers are diphenyl-, dinaphthyl- and phenyl-naphtyl-amines, in which the phenyl and naphthyl groups can be substituted, e.g., N,N'-diphenyl phenylenediamine, p-octylidiphenylamine, p,p-dioctyldiphenylamine, N-phenyl-1-naphthyl amine, N-phenyl-2-naphthyl amine, N-(p-dodecyl)-phenyl-2-naphthyl amine, di-1-naphthylamine, and di-2-naphthylamine; phenothazines such as N-alkylphenothiazines; imino(-bisbenzyl); and hindered phenols such as 6-(t-butyl) phenol, 2,6-di (t-butyl) phenol, 4-methyl-2,6-di-(t-butyl) phenol, 4,4"-methylenebis (-2,6-di-(t-butyl)phenol), and the like.

Examples of suitable cuprous metal deactivators are imidazole, benzamidazole, 2-mercaptobenzthiazole, 2,5-dimercaptothiadiazole, salicylidine-propylenediame, pyrazole, benzotriazole, tolutriazole, 2-methylbanzamidazole, 3,5-dimethyl pyrazole, and methylene bis-benzotriazole. Benzotriazole derivatives are preferred. Other examples of more general metal deactivators and/or corrosion inhibitors include organic acids and their esters, metal salts, and anhydrides, e.g., N-oleyl-sarcosine, sorbitan monooleate, lead naphthenate, dodecenyl-succinic acid and its partial esters and amides, and 4-nonylphenoxy acetic acid; primary, secondary, and tertiary aliphatic and cycloaliphatic amines and amine salts of organic and inorganic acids, e.g., oil-soluble alkylammonium carboxylates; heterocyclic nitrogen containing compounds, e.g., thiadiazoles, substituted imidazolines, and oxazolines; quinolines, quinones, and anthraquinones; propyl gallate; barium dinonyl naphthalene sulfonate; ester and amide derivatives of alkenyl succinic anhydrides or acids, dithiocarbamates, dithiophosphates, amine salts of alkyl acid phosphates and their derivatives.

Examples of suitable lubricity additives include long chain derivatives of fatty acids and natural oils, such as esters, amines, amides, imidazolines, and borates.

Examples of suitable viscosity index improvers include polymethacrylates, copolymers of vinyl pyrrolidone and methacrylates, polybutenes, and styrene-acrylate copolymers.

Examples of suitable pour point and/or floc point depressants include polymethacrylates such as methacrylate-ethylene-vinyl acetate terpolymers; alkylated naphthalene derivatives, and products of Friedel-Crafts catalyzed condensation of urea with naphthalene or phenols.

Examples of suitable detergents and/or dispersants include polybutenylsuccinic acid amides; polybutenyl phosphonic acid derivatives; long chain alkyl substituted aromatic sulfonic acids and their salts; and methyl salts of alkyl sulfides, of alkyl phenols, and of condensation products of alkyl phenols and aldehydes.

Examples of suitable anti-foam agents include silicone polymers and some acrylates.

Examples of foam promoters include silicone polymers with a different molecular structure than the silicone polymers used as anti-foam agents.

Examples of suitable anti-wear and extreme pressure resistance agents include sulfurized fatty acids and fatty acid esters, such as sulfurized octyl tallate; sulfurized terpenes; sulfurized olefins; organopolysulfides; organo phosphorus derivatives including amine phosphates, alkyl acid phosphates, dialkyl phosphantes, aminedithiophosphates, trialkyl and triaryl phosphorothionates, trialkyl and triaryl phosphines, and dialkylphosphites, e.g., amine salts of phosphoric acid monohexyl ester, amine salts of dinonylnaphthalene sulfonate, triphenyl phosphate, trinaphthyl phosphate, diphenyl cresyl and dicresyl phenyl phosphates, naphthyl diphenyl phosphate, triphenylphosphorothionate; dithiocarbamates, such as an antimony dialkyl dithiocarbamate; chlorinated and/or fluorinated hydrocarbons, and xanthates.

Under some conditions of operation, it is believed that the presence in lubricants of the types of polyether polyols that have been prominent constituents of most prior art lubricant base stocks taught as useful with fluorocarbon refrigerant working fluids are less than optimally stable and or inadequately compatible with some of the most useful lubricant additives. Thus, in one embodiment of this invention, it is preferred that the lubricant base stocks and lubricant be substantially free of such polyether polyols. By "substantially free", it is meant that the compositions contain no more than about 10% by weight, preferably no more than about 2.6% by weight and more preferably no more than about 1.2% by weight of the materials noted.

One major embodiment of the present invention is a refrigerant working fluid comprising both a suitable heat transfer fluid such as a fluorocarbon and a blended lubricant according to this invention. Preferably, the refrigerant working fluid and the blended lubricant should have chemical characteristics and be present in such a proportion to each other that the working fluid remains homogeneous, i.e., free from visually detectable phase separations or turbidity, over the entire range of working temperatures to which the working fluid is exposed during operation of a refrigeration system in which the working fluid is used. This working range may very from −60° C. to as much as 175° C. It is often adequate if the working fluid remains single phase up to +30° C., although it is increasingly more preferable if the single phase behavior is maintained up to 40, 56, 71, 99, or 100° C. Similarly, it is often adequate if the working fluid compositions remain a single phase when chilled to 0° C., although it is increasingly more preferable if the single phase behavior persists to −10, −20, −30, −40, or −55° C. Single phase mixtures with chlorine-free hydrofluorocarbon heat transfer fluids can often be obtained with blended esters described above, with the most preferred ester blends being most likely to give such single phase behavior over a wide temperature range. It should be noted that it is not necessary for the blending stocks themselves to exhibit such single phase behavior in order for the blends to do so. For example, the ester of PE with EHA is immiscible with Refrigerant 134a below −31° F. (−35° C.), but a blend of 47.24% by weight of this ester with 57.76% by weight of the ester of NPG with EHA exhibits single phase behavior with R134a to a much lower temperature.

Inasmuch as it is often difficult to predict exactly how much lubricant will be mixed with the heat transfer fluid to form a working fluid, it is most preferable if the lubricant composition forms a single phase in all proportions with the heat transfer fluid over the temperature ranges noted above. This however, is a very stringent requirement, and it is often sufficient if there is single phase behavior over the entire temperature range for a working fluid mixture containing up to 1% by weight of lubricant according to this invention. Single phase behavior over a temperature range for mixtures containing up to 2, 4, 10, and 15% by weight of lubricant is successively more preferable.

In some cases, single phase behavior is not required. The term "miscible" is used in the refrigeration lubricant art and hereinafter, except when part of the phrase "miscible in all proportions", when two phases are formed but are readily capable of being mixed into a uniform dispersion that remains stable as long as it is at least moderately agitated mechanically. Some refrigeration (and other) compressors are designed to operate satisfactorily with such miscible mixtures of refrigerant working fluid and lubricant. In contrast, mixtures that lead to coagulation or significant thickening and form two or more phases are unacceptable commercially and are designated herein as "immiscible".

Another major embodiment of the invention is the use of a lubricant blend according to this invention, either as total lubricant or lubricant base stock, as lubricant in a process of operating refrigerating machinery in such a manner that the lubricant is in contact with the refrigerant working fluid.

The ranges and preferred ranges of viscosity and variation of viscosity with temperature for lubricant compositions according to this invention are generally the same as established in the art for lubricants to be used in refrigeration systems together with a heat transfer fluid, particularly a fluorocarbon and/or chlorofluorocarbon heat transfer fluid. In general, it is preferred that lubricants according to this invention have International Organization for Standardization ("ISO") viscosity grade numbers between 10 and 32.

The viscosity ranges for some of the ISO viscosity grade numbers are given in Table 1.

TABLE 1

| ISO Viscosity Grade Number | Viscosity Range In Centistokes at 40° C. | |
|---|---|---|
| | Minimum | Maximum |
| 2 | 1.98 | 2.42 |
| 3 | 2.88 | 3.53 |
| 5 | 4.14 | 5.06 |
| 7 | 6.12 | 7.48 |
| 10 | 9.00 | 11.0 |
| 15 | 13.5 | 16.5 |
| 22 | 19.8 | 24.2 |
| 32 | 28.8 | 35.2 |
| 46 | 41.4 | 50.6 |
| 68 | 61.2 | 74.8 |
| 100 | 90.0 | 110. |
| 150 | 135. | 165. |
| 220 | 198. | 242. |
| 320 | 288. | 352. |
| 460 | 414. | 506. |
| 680 | 612. | 748. |
| 1000 | 900. | 1100. |
| 1500 | 1350. | 1650. |

The practice of the invention may be further understood and appreciated by consideration of the following examples and comparative examples.

General Ester Synthesis Procedure

The alcohol and acid to be reacted, together with a suitable catalyst such a dibutyltin diacetate, tin oxalate, phosphoric acid, and/or tetrabutyl titanate, were charged into a round bottomed flask equipped with a stirrer, thermometer, nitrogen sparging means, condenser, and a recycle trap. Acid was charged in about 15% molar excess over the alcohol. The amount of catalyst was from 0.02 to 0.1% by weight of the weight of the total acid and alcohol reacted.

The reaction mixture was heated to a temperature between about 220 and 230° C., and water from the resulting reaction was collected in the trap while refluxing acids were returned to the reaction mixture. Partial vacuum was maintained above the reaction mixture as necessary to achieve a reflux rate of between 8 and 12% of the original reaction mixture volume per hour.

The reaction mixture was sampled occasionally for determination of hydroxyl number, and after the hydroxyl number had fallen below 5.0 mg of KOH per gram of mixture, the majority of the excess acid was removed by distillation after applying the highest vacuum obtainable with the apparatus used, corresponding to a residual pressure of about 0.05 torr, while maintaining the reaction temperature. The reactions mixture was then cooled, and any residual acidity was removed, if desired, by treatment with lime, sodium hydroxide, or epoxy esters. The resulting lubricant or lubricant base stock was dried and filtered before blending and phase compatibility testing.

General Procedure For Phase Compatibility Testing

One milliliter ("ml") of the lubricant to be tested is placed into a thermal shock resistant, volumetrically graduated glass test tube 17 millimeters ("mm") in diameter and 145 mm long the test tube is then stoppered and placed into a cooling bath regulated to −29°±0.2° C. After the tube and contents have been equilibrating in the cooling bath, the tube contents are visually examined for evidence of phase separation. If there is any such phase separation, the combination is recorded as immiscible.

If there is no evidence of phase separation at −29° C., the temperature of the cooling bath is usually lowered at a rate of 0.3° per min until phase separation is observed. The temperature of first observation of phase separation, if within the range of the cooling equipment used, is then noted as the R134a miscibility temperature.

Composition of Blending Stocks

Ester A, as described above, was prepared by reacting an alcohol which was substantially 100% NPG, with an acid that included substantially 100% 2-ethylhexanoic acid. The resulting ester had a viscosity of 8 centistokes at 40° C.

To measure the thermal stability of the ester lubricants as described above, with 1,1,1,2-tetrafluoroethane refrigerant, the sealed tube test was performed at a high temperature. The test method involves the following steps: first, 1.5 ml of ester lubricant, 1.5 ml of 1,1,1,2-tetrafluoroethane, and one piece each of iron, copper and aluminum test pieces (1.7 mm in diameter, 40 mm in length) were sealed in a glass tube, and the tube was heated at 175° for 14 days (336 hours). After the test was completed, the change of color of the specimen oil was measured, and the conditions of the metal pieces were examined. The properties of the ester lubricant samples and the other test results are shown in Table 2 below.

TABLE 2

|  | E-4159-X | E-4160-X | E-4161-X | E-4162-X | E-4164-X |
|---|---|---|---|---|---|
| NPG di-2-ethylhexanoate | 100 | — | 78.54 | 52.76 | 30.83 |
| PE tetra-2-ethylhexanoate | — | 100 | 21.46 | 47.24 | 69.17 |
| Viscosity Grade | 8 | 44 | 10 | 15 | 22 |
| Properties |  |  |  |  |  |
| Visc. @ 100° C., cSt | 2.06 | 6.27 | 2.46 | 3.20 | 4.08 |
| Visc. @ 40° C., cSt | 8.01 | 44.38 | 10.05 | 14.94 | 22.26 |
| VI | 22 | 84 | 47 | 62 | 66 |
| Flash, ° F. | 355 | 485 | 380 | 390 | 410 |
| Pour, ° F. | −95 | +30 | −90 | −75 | −70 |
| R134a Miscibility, ° F. | <−70 | −31 | <−70 | −41.5 | −32 |
| Hydrolytic Stability[1] |  |  |  |  |  |
| Final AV | 0.02 | 0.02 | 0.02 | 0.02 | 0.02 |
| Sealed Tube Terminal |  |  |  |  |  |
| Stability[2] |  |  |  |  |  |
| Oil | No change | No change | No change | No change | No change |
| Aluminum | No change | No change | No change | No change | No change |
| Copper | Orange Above Liquid | Orange Above Liquid | No change | No change | No change |
| Steel | Blue-green | Tan Above Liquid; Blue-green Below | No change | Blue/green | Blue/green Below Liquid Lt. Tan Above |

[1]Test Method: Sealed Tube, oil/R134a, 1000 ppm water, 175° C., 14 days
[2]175° C., 14 days, oil:R134a (1:1)

Ester B. as described above, was prepared by reacting an alcohol in which substantially 100% PE, with an acid that was substantially 100% 2-ethylhexanoic acid. The product had a viscosity of 52 centistokes at 40° C.

Examples of Specific Blended Esters

Examples of ester blends according to the present invention that were made by mixing the above-described blending stocks are set forth in the following table.

As can be seen from the data in the table, ester blends of this invention exhibit good compatibility with refrigerant R134a over a wide temperature range, and have high hydrolytic stability and low acid value (representing concentration of free acid).

Hydrolytic stability was measured as follows: 70 grams of the ester lubricant base stock and 70 grams of R134a containing 1000 ppm water are placed into a tube that is then sealed. The sealed tube is heated to 175° C. and held at that temperature for 14 days. Then the acid value of the products is measured for hydrolytic stability by the ASTM D-924 procedure which is incorporated herein by reference.

Although the various aspects of the present invention have been described and exemplified above in terms of certain preferred embodiments, various other embodiments may be apparent to those skilled in the art. The invention is, therefore, not limited to the embodiments specifically described and exemplified herein, but is capable of variation and modification without departing from the scope of the appended claims.

What is claimed is:

1. A refrigerant working fluid consisting essentially of at least 85 percent by weight of 1,1,1,2-tetrafluoroethane and the balance of a lubricant composition consisting essentially of an ester blend having a viscosity of about 15 centistokes at 40° C., and forming a single phase with 1,1,1,2-tetrafluoroethane between about −40° C. and about +71° C., said ester blend consisting essentially of (a) about 53% by weight of an ester having neopentylglycol and a source of 2-ethylhexanoic acid as its reactive components and (b) about 47% by weight of an ester having pentaerythritol and a source of 2-ethylhexanoic acid as its reactive components and wherein the acid value of the lubricant composition is not greater than about 0.02 mg KOH/g.

2. A process for operating a refrigerator comprising cyclic compression, liquefaction, expansion and evaporation of the refrigerant working fluid of claim 1.

3. A refrigerant working fluid consisting essentially of at least 85 percent by weight of 1,1,1,2-tetrafluoroethane and the balance of a compounded lubricant consisting essentially of at least about 90 weight percent of a lubricant composition consisting essentially of an ester blend having a viscosity of about 15 centistokes at 40° C. and forming a single phase with 1,1,1,2-tetrafluoroethane between about −40° C. and about +71° C., said ester blend consisting essentially of (a) about 53% by weight of an ester having neopentylglycol and a source of 2-ethylhexanoic acid as its reactive components and (b) about 47% by weight of an ester having pentaerythritol and a source of 2-ethylhexanoic acid as its reactive components wherein the acid value of the lubricant composition is not greater than about 0.02 mg KOH/g and a balance of one or more additives selected from the group of oxidation resistance and thermal stability improvers, corrosion inhibitors, metal deactivators, lubricity additives, viscosity index improvers, pour and floc point depressants, detergents, dispersants, anti-foaming agents, antiwear agents, and extreme pressure resistant agents.

4. A process for operating a refrigerator comprising cyclic compression, liquefaction, expansion and evaporation of the refrigerant working fluid of claim 3.

* * * * *